United States Patent
Scharf et al.

(10) Patent No.: US 9,674,054 B2
(45) Date of Patent: Jun. 6, 2017

(54) CONCEPT FOR PROVIDING INFORMATION ON A DATA PACKET ASSOCIATION AND FOR FORWARDING A DATA PACKET

(75) Inventors: Michael Scharf, Stuttgart (DE); Thomas-Rolf Banniza, Schwieberdingen (DE)

(73) Assignee: Alcatel Lucent, Boulogne-Billancourt (FR)

( * ) Notice: Subject to any disclaimer, the term of this patent is extended or adjusted under 35 U.S.C. 154(b) by 282 days.

(21) Appl. No.: 13/984,427

(22) PCT Filed: Feb. 16, 2012

(86) PCT No.: PCT/EP2012/052699
§ 371 (c)(1),
(2), (4) Date: Aug. 8, 2013

(87) PCT Pub. No.: WO2012/116897
PCT Pub. Date: Sep. 7, 2012

(65) Prior Publication Data
US 2013/0318239 A1    Nov. 28, 2013

(30) Foreign Application Priority Data

Mar. 2, 2011 (EP) .................... 11156508

(51) Int. Cl.
*H04L 12/26* (2006.01)
*H04L 29/08* (2006.01)
(Continued)

(52) U.S. Cl.
CPC .......... *H04L 43/04* (2013.01); *H04L 67/1002* (2013.01); *H04L 67/142* (2013.01);
(Continued)

(58) Field of Classification Search
CPC .... H04L 29/08072; H04L 29/06; H04L 43/00
(Continued)

(56) References Cited

U.S. PATENT DOCUMENTS 6,856,991 B1    2/2005   Srivastava
8,090,866 B1 *  1/2012   Bashyam ................ H04L 69/16
                                                         709/212

(Continued)

OTHER PUBLICATIONS

Fort et al., "TCP Extensions for Multipath Operation with Multiple Addresses," IETF Internet Draft draft-ietf-mptcp-multiaddressed-00, Jun. 2010.*

(Continued)

*Primary Examiner* — Nicholas Taylor
*Assistant Examiner* — Chong G Kim
(74) *Attorney, Agent, or Firm* — Harness, Dickey & Pierce, P.L.C.

(57) ABSTRACT

In an apparatus for forwarding a present data packet from a present source network entity to a present destination network entity, the present destination network entity is selected from a plurality of destination network entities. The apparatus receives the present data packet and selects the present destination network entity based on a load balancing criterion. The apparatus forwards the present data packet to the present destination network entity and receives a response data packet from the present network destination entity. The response data packet includes information on a data packet association. The data packet association is an association between a plurality of different data packets belonging to a data session between a data source and a data destination. The apparatus stores the information on the association.

8 Claims, 6 Drawing Sheets

(51) Int. Cl.
*H04L 29/06* (2006.01)
*H04W 76/02* (2009.01)
*H04W 28/08* (2009.01)

(52) U.S. Cl.
CPC .............. *H04L 69/14* (2013.01); *H04L 69/16* (2013.01); *H04W 28/08* (2013.01); *H04W 76/02* (2013.01)

(58) Field of Classification Search
USPC ........................................................ 709/224
See application file for complete search history.

(56) References Cited

U.S. PATENT DOCUMENTS

| | | | |
|---|---|---|---|
| 2002/0120743 A1* | 8/2002 | Shabtay | H04L 67/1008 709/226 |
| 2005/0108397 A1* | 5/2005 | Basso | H04L 67/1002 709/225 |
| 2005/0149531 A1 | 7/2005 | Srivastava | |
| 2006/0029000 A1* | 2/2006 | Waldvogel | H04L 69/16 370/254 |
| 2007/0149123 A1 | 6/2007 | Palin | |
| 2007/0230352 A1* | 10/2007 | Kokku | H04L 45/24 370/238 |
| 2008/0235382 A1* | 9/2008 | Marwah | H04L 69/16 709/228 |
| 2011/0320617 A1* | 12/2011 | Annamalaisami | H04L 63/1458 709/228 |
| 2012/0020248 A1* | 1/2012 | Granlund | H04W 28/18 370/254 |
| 2012/0054316 A1* | 3/2012 | Piazza et al. | 709/219 |
| 2012/0093150 A1* | 4/2012 | Kini | 370/389 |
| 2012/0099601 A1* | 4/2012 | Haddad | H04L 69/16 370/401 |
| 2012/0144062 A1* | 6/2012 | Livet | H04L 45/24 709/239 |
| 2012/0271938 A1* | 10/2012 | Livet et al. | 709/224 |
| 2012/0331160 A1* | 12/2012 | Tremblay | H04L 29/08702 709/228 |

OTHER PUBLICATIONS

Dierks et al., "The Transport Layer Security (TLS) Protocol Version 1.2," IETF RFC 5246, Aug. 2008.*
Scharf, "Multi-Connection TCP (MCTCP) Transport," IETF Internet Draft draft-scharf-mptcp-mctcp-01, Jul. 2010.*
Singh et al, "PayLoad Multi-connection Transport using Multiple Addresses," IETF Internet Draft draft-singh-mptcp-plmt-00, Aug. 2010.*
Scharf et al., "An initial prototype of multi-connection TCP Transport," Demo at Euroview 2010 Workshop, Wuerzburg, Germany, Aug. 2010.*
Scharf et al., "MPTCP Application Interface Considerations," IETF Internet Draft, Nov. 2010.*
Ford et al., "Architectural Guidelines for Multipath TCP Development," IETF Internet Draft draft-ietf-mptcp-architecture-05, Jan. 2011.*
Raiciu et al., "Coupled Congestion Control for Multipath Transport Protocols," IETF Internet Draft, Jan. 2011.*
Barre et al., "Multipath TCP: From theory to Practice," in Proc. IFIP Networking, May 2011.*
Scharf, M. "Multi-Connection TCP (MCTCP) Transport; draft-scharf-mptcp-mctcp-00.txt", Internet Engineering Task Force, IETF; Standardworkingdraft, Internet Society (ISOC); Geneva, Switzerland; Jul. 2010 (Jul. 1, 2010), pp. 1-31, XP015069240.
Ford, A. et al. "TCP Extensions for Multipath Operation with Multiple Addresses; draft-ietf-mptcp-multiaddressed-02.txt", Internet Engineering Task Force, IETF; Standardworkingdraft, Internet Society (ISOC); Geneva, Switzerland; Oct. 2010 (Oct. 25, 2010), pp. 1-44, XP015072224.
Ford, A. et al. "Architectural Guidelines for Multipath TCP Development; draft-ietf-mptcp-architecture-05.txt", Internet Engineering Task Force, IETF; Standardworkingdraft, Internet Society (ISOC); Geneva, Switzerland; Jan. 2011 (Jan. 21, 2011), pp. 1-29, XP015073614.
Written Opinion PCT/ISA/237 for PCT/EP2012/052699 dated Mar. 22, 2012.
International Search Report PCT/ISA/210 for PCT/EP2012/052699 dated Mar. 22, 2012.

* cited by examiner

CONCEPT FOR PROVIDING INFORMATION ON A DATA PACKET ASSOCIATION AND FOR FORWARDING A DATA PACKET

This application is the national phase under 35 U.S.C. §371 of PCT International Application No. PCT/EP2012/052699 which has an International filing date of Feb. 16, 2012, which claims priority to European patent application number 11156508.1 filed Mar. 2, 2011; the entire contents of each of which are hereby encorporated by reference.

The present invention relates to communication networks, more particularly but not exclusively to multipath or coupled transmission in communication networks.

BACKGROUND

Packet switched communication networks are steadily expanding in both fields of wired and wireless communications. With the increasing demand for data packet services the networks' loads as well as their capacities are growing. For some services the demand for data can be higher than the capacity of a single server or data source. Therefore, some capacity enhancement concepts foresee using multiple network entities, as e.g. server farms, to provide the same service. The demand and the associated traffic load can then be shared among these network entities providing the same data service using load balancing.

Load balancers are a widely used solution to scale service provisioning in the Internet, and specifically for the World Wide Web (WWW for abbreviation) using the Hyper Text Transfer Protocol (HTTP for abbreviation). These, mostly based on the Internet Protocol (IP for abbreviation), WWW services cannot be provided by a single server if they become popular, as the resulting utilization may easily overload even a powerful server device. One widely deployed solution is to distribute the load among several servers, either in a single server farm, or among geographically distributed servers. A "load balancer" is a network entity that can distribute incoming service requests, e. g. Transmission Control Protocol (TCP for abbreviation) connections or HTTP requests, to one out of several servers. The actual dispatching to a server can be realized by different methods. On the one hand, this includes intelligent use of link layer addresses and/or packet rewriting techniques that translate address and port fields. These solutions are transparent to a terminal; i. e. the client does not notice that a service is served by more than one server. On the other hand, there are mechanisms such as HTTP redirection, content rewriting, or Domain Name System (DNS for abbreviation) based load balancing, which are not transparent.

Some existing load balancer solutions are designed for standard TCP connections. For multimedia services there may also be equivalent load balancers for Universal Datagram Protocol (UDP for abbreviation) traffic. In the following TCP-based services will be considered. The Internet Engineering Task Force (IETF for abbreviation) currently standardizes Multipath TCP (MPTCP for abbreviation) as a TCP extension that uses several coupled connections, which are also called "subflows", in order to enable concurrent data transfers over several potentially disjoint paths. An individual subflow is similar to a TCP connection, but typically only transports a subset of the data. Multipath TCP is transparent to applications, which can access a session consisting of several subflows, or data packets which are associated with each other, like a single TCP connection.

SUMMARY

Embodiments can be based on the finding that a coupling of TCP connections may cause problems in a scenario using a load balancer. A service using Multipath TCP may be degraded by existing load balancer solutions, since they are unaware of the coupling of TCP connections. Embodiments can be further based on the finding that multipath services can be improved by additional support in such a load balancer.

Embodiments can be further based on the finding that the subflows of a Multipath TCP session are coupled even if they may use completely different source and destination IP addresses and TCP port numbers. Generally, such a subflow can be comprised of a plurality of data packets. According to the current Multipath TCP protocol specification, this can be realized by an additional identifier in the TCP protocol header, which is also referred to as "token", which is exchanged during the connection setup. In other words, data packets of different subflows may be associated with each other and may comprise information on the data packet association. Endpoints of a Multipath TCP session can determine this way what session a new Multipath TCP subflow belongs to, and add it to this session. Embodiments may therefore make use of such an identifier, or generally may make use of information on a data packet association comprised in such data packets.

Embodiments may further be based on the finding that, for example, a transparent load balancer may operate as a TCP/IP gateway, e.g. a layer 4 gateway, and balancers dispatch data packets of an incoming TCP connection to one out of several servers, according to certain policies. For instance, it might make sense to assign all connections from one IP address to the same server so that all HTTP requests of one client are served by the same Web server. It is another finding of embodiments, that if data packets originate from different network entities, as e.g. when using MPTCP, IP address driven assignment may lead to failures, as the associated data packet of different subflows may have different IP addresses and may therefore be assigned to different servers. Some further scenarios will be discussed in more detail subsequently.

Embodiments provide an apparatus adapted for forwarding a present data packet from a present source network entity to a present destination network entity, the present destination network entity being selected from a plurality of destination network entities. The apparatus comprises means adapted for receiving the present data packet and means adapted for selecting the present destination network entity based on a load balancing criterion. The apparatus further comprises means adapted for forwarding the present data packet to the present destination network entity and means adapted for receiving a response data packet from the present network destination entity, the response data packet comprising information on a data packet association. The data packet association is an association between a plurality of different data packets belonging to a data session between a data source and a data destination. For example, a terminal, as a data source, has a data session with a server, as a data destination, using MPTCP, having at least two subflows being comprised of multiple data packets. Then the data packets of the two subflows are associated in a data packet association. The means adapted for selecting is further adapted for storing the information on the association.

In other words, in an embodiment the apparatus may monitor information on a data packet association in a data packet, for example, the apparatus may be implemented in a load balancer and monitor the MPTCP tokens. For instance, when such a connection is set up, the information on the data packet association may be exchanged between the involved source and destination network entities. The apparatus may monitor the information and store it, e.g. in a memory.

In some embodiments the means adapted for receiving can be further adapted for receiving an associated data packet from a different source network entity, the associated data packet being received after the response data packet, the associated data packet belonging to the data session and comprising information on the data packet association. In other words, the apparatus may subsequently receive another data packet from a different source network node or entity. The subsequently received other data packet may be received with a different address, e. g, a different IP address and/or port number, for instance, originating from a different source network node or entity, where the different source or entity may, for example, correspond to a physically different node as a different router or to a different interface of the same origin. The means adapted for selecting can be further adapted for selecting the present destination network entity based on the information on the data packet association and the means adapted for forwarding can be further adapted for forwarding the associated data packet to the present destination network entity. And thus, in an embodiment, the data packet coming from a different source may be identified as belonging to the data packet association, based on the stored information on the data packet association and the information on the data packet association comprised in the data packet, and then forwarded to the same and correct destination. Embodiments may therewith overcome problems evoked by, e.g. IP address driven load balancing, possibly assigning associated data packets to different destinations.

In embodiments the information on the data packet association comprised in the response data packet can be identical to the information on the data packet association comprised in the associated data packet. In some embodiments the data packet associated may use the same token. In other words, in some embodiments the information on the data packet association may correspond to a token of Multipath TCP or to a set of different tokens of Multipath TCP. A token can be interpreted as any kind of identification, as e.g. a number or a sequence of bits, etc. In some embodiments, e.g. when a set of tokens is used for an association, the information on the data packet association comprised in the response data packet can be different from the information comprised in the associated data packet. In further embodiments the tokens in associated packets of different subflows of a data session can be calculated by a function from the information exchanged in an initial subflow and potentially additional information shared by both endpoints. In other words, when a set of tokens is used, the different subflows may use different tokens, however, an embodiment of the apparatus may still select the correct destination network entities, as the set of tokens may be stored. In embodiments, the information on the data packet association comprised in the response data packet can correspond to a set of different tokens of Multipath TCP and the information on the data packet association comprised in the associated data packet may correspond to a single token of Multipath TCP comprised in the set of different tokens of Multipath TCP. The means adapted for selecting can be further adapted for storing information on the present destination network entity together with the information on the data packet association.

In further embodiments the means adapted for selecting can be further adapted for removing the information on the data packet association from storage after a predefined time has elapsed without receiving a data packet comprising the information on the data packet association. Alternatively, the information may be removed if all subflows or the MPTCP session, or the data packet association, are explicitly closed. In other words, embodiments of the apparatus may use a time-out mechanism and, if no packets from a certain packet association are received during a certain time period, the information on the data packet association may be removed from the storage. So, for example, a token or a set of tokens can be re-used and is not blocked for extended periods when no associated data packets are received.

Moreover, if, e.g. during a set-up phase of a data packet association, a token is used, which is already in use by another packet data association, an embodiment may prevent the new data association from being established with this token. The means adapted for receiving can be further adapted for receiving a further response data packet from a different network destination entity, the further response data packet comprising information on the data packet association. The apparatus may comprise means adapted for removing the information on the data association from the further response data packet. By removing the re-used information on the data packet association, embodiments may prevent failure evoked by ambiguity of a data packet association. In some embodiments, the means adapted for receiving can be further adapted for receiving a further response data packet from a different network destination entity, the further response data packet comprising information on the data packet association. The apparatus may comprise means adapted for changing the information on the data association in the further response data packet to different information on the data packet association. In other words, the apparatus may comprise means adapted for changing the information on a data packet association upon ambiguity detection.

In further embodiments, the information on the data packet association can also be received from other network entities, e.g. an entity for central coordination of the information on data packet associations or token assignment for avoiding ambiguities. Thus, the apparatus may comprise further means adapted for receiving a data association packet from a network entity, the data association packet comprising the information on the different data packet association. The means adapted for receiving may correspond to any interface. In embodiments, the apparatus may be comprised in a load balancer.

Embodiments may also provide a system with a data source network entity, a load balancer comprising the above described apparatus and multiple servers or destination network entities.

Embodiments may further provide an apparatus for providing information on a data packet association to a network entity, e.g. in a network entity for central coordination. The apparatus may comprise means adapted for generating identification for a data packet association, the identification for the data packet association being valid for a time period. The means adapted for generating can be further adapted for generating a plurality of identifications for data packet associations, wherein each of the plurality of identifications is different from the identification for the data packet association when generated during the time period. The apparatus may further comprise means adapted for providing the information on the data packet association comprising information on the identification of the data packet association to different network entities. In embodiments the identification may correspond to a token.

Embodiments also comprise a method for forwarding a present data packet from a present source network entity to a present destination network entity, the present destination network entity being selected from a plurality of destination network entities. The method may comprise a step of receiving the present data packet and a step of selecting the present destination network entity based on a load balancing criterion. The method may further comprise a step of forwarding the present data packet to the present destination network entity and a step of receiving a response data packet from the present network destination entity, the response data packet comprising information on a data packet association, the data packet association being an association between a plurality of different data packets belonging to a data session between a data source and a data destination. The method may further comprise storing the information on the association.

Furthermore, embodiments provide a method for providing information on a data packet association to a network entity, the method comprises a step of generating an identification for a data packet association, the identification for the data packet association being of valid for a time period. The method further comprises a step of providing the information on the data packet association comprising information on the identification of the data packet association to different network entities. The method can further comprise a step of generating a plurality of identifications for data packet associations, wherein each of the plurality of identifications is different from the identification for the data packet association when generated during the time period.

Moreover, embodiments may provide a computer program having a program code for performing one of the above methods, when the computer program is executed on a computer or processor.

BRIEF DESCRIPTION OF THE FIGURES

Some other features or aspects will be described using the following non-limiting embodiments of apparatuses and/or methods and/or computer programs by way of example only, and with reference to the accompanying figures, in which.

DESCRIPTION OF SOME DETAILED EMBODIMENTS

The illustrative description of the embodiments will be given in details combined with the appended figures. For the ease of understanding, some technical terms are explained first:

In the following a single connection corresponds to an association between two endpoints (initiator and responder) for bidirectional communication. For example, the initiator can be a data source and the responder can be a data destination in one direction, vice versa in the other direction, respectively. A connection can for instance be defined by IP addresses and port numbers at both endpoints. Standard TCP uses such single connections for data transfers between hosts, e.g. data source and data destination.

A coupled connection corresponds to an association between two endpoints that uses similar protocol semantics like a single connection, but that is not stand-alone, but part of a session. Data packets of one session may be associated, e.g. by using a certain identifier or token. In particular, such associations can be set up using setup messages comprising a token, the token may not (necessarily) be present in all messages exchanged in a session. An association of data packets may be a protocol property that associates multiple data packets to a session; the session may comprise multiple subflows, each of which may comprise subsequent data packets. The data packets can all be associated to a session, the data packets can be associated to a subflow, which can be associated to a session or another subflow, and/or the data packets can be associated among each other, for example to data packets of a different subflow. Not only in the context of Multipath TCP is a coupled connection also called subflow. In embodiments, network entities may distinguish single and coupled connections by analysing the packets.

A session refers to a combination of one or more coupled connection(s) between two hosts, e.g., a client/terminal and a server, a data source and a data destination, etc. In case of Multipath TCP a session is also called "MPTCP connection". A session may be a protocol context between a data source and a data destination, where multiple associated subflows are used for data transmission. Each of the subflows may be comprised of a plurality of data packets, where the data packets of different flows are associated to the session and therewith between each other.

A first (coupled) connection of a session or first subflow may correspond to subsequent data packets belonging to an initial or first subflow in a session. An additional (coupled) connection may correspond to any further coupled connection of a session, or additional subflow. The subsequent data packets belonging to an additional subflow may be associated to the subsequent data packets belonging to a first subflow using information on a data packet association, e.g. information on the common session they belong to.

Figure 1A:
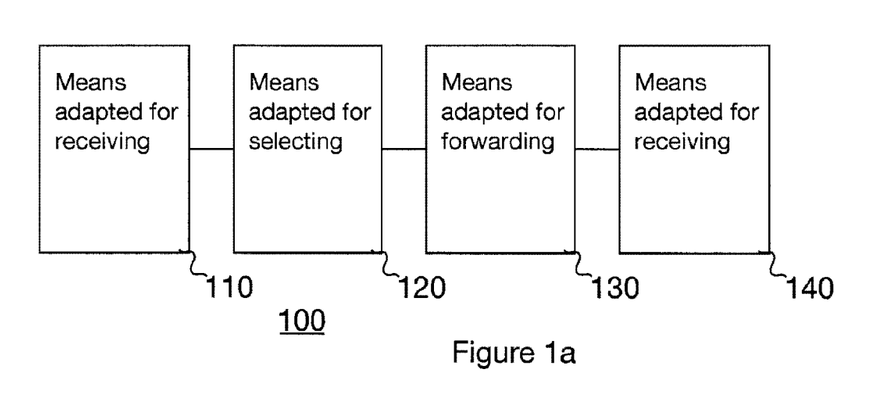
FIG. 1a illustrates a block diagram of an embodiment of an apparatus adapted for forwarding.

FIG. 1a illustrates a block diagram of an embodiment of an apparatus 100 adapted for forwarding. The apparatus 100 is adapted for forwarding a present data packet from a present source network entity to a present destination network entity, the present destination network entity being selected from a plurality of destination network entities. The apparatus 100 comprises means 110 adapted for receiving the present data packet, e.g. implemented as a receiver or an interface as an Ethernet interface or any air interface, etc. Moreover, the apparatus 100 comprises means 120 adapted for selecting the present destination network entity based on a load balancing criterion, e.g. implemented as a selector, controller, processor etc. Furthermore, the apparatus 100 comprises means 130 adapted for forwarding the present data packet to the present destination network entity, the means 130 may be implemented as a forwarder, a transmitter, an interface etc. Moreover, the apparatus 100 comprises means 140 adapted for receiving a response data packet from the present network destination entity, the response data packet comprising information on a data packet association, the data packet association being an association between a plurality of different data packets belonging to a data session between a data source and a data destination. The means 140 adapted for receiving may again be implemented as a receiver or an interface as an Ethernet interface or any air interface, etc. In some embodiments the means 120 and the means 140 may be implemented separately, in some embodiments they may be implemented in the same functional entity. The means 120 adapted for selecting is further adapted for storing the information on the data packet association. In other words, the apparatus 100 may store the information on the data packet association during a setup of a first subflow of a data session.

Figure 1B:
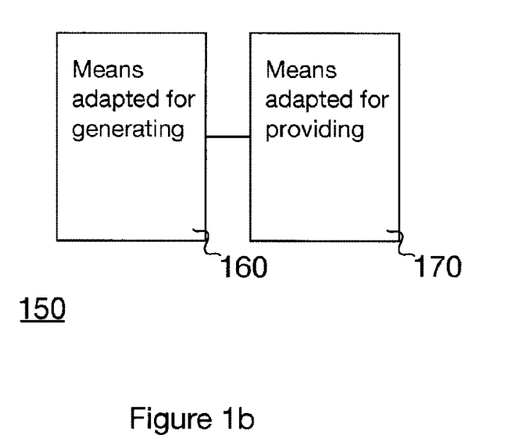
FIG. 1b illustrates a block diagram of an embodiment of an apparatus for providing.

FIG. 1b illustrates a block diagram of an embodiment of an apparatus 150 for providing information on a data packet association. The apparatus 150 for providing information on a data packet association to a network entity comprises means 160 adapted for generating identification for a data packet association, the identification for the data packet association being valid for a time period. Such identification may correspond to a token for a MPTCP session. The means 160 may correspond to a generator, e.g. implemented as a random number generator, a pseudo random number generator, etc. The means 160 adapted for generating is further adapted for generating a plurality of identifications for data packet associations, wherein each of the plurality of identifications is different from the identification for the data packet association when generated during the time period. I.e. in embodiments the apparatus 150 may generate the identification such that it is unique during its validity time. The apparatus 150 comprises means 170 adapted for providing the information on the data packet association comprising information on the identification of the data packet association to different network entities. In other words, such unique identification can be provided to multiple network entities, which receive the identifications from the apparatus, e.g. carrying out central generation of MPTCP tokens. Therewith, ambiguity issues related to distributed generation of tokens, i.e. independent generation of tokens at multiple network entities, may be solved by embodiments.

Figure 2:
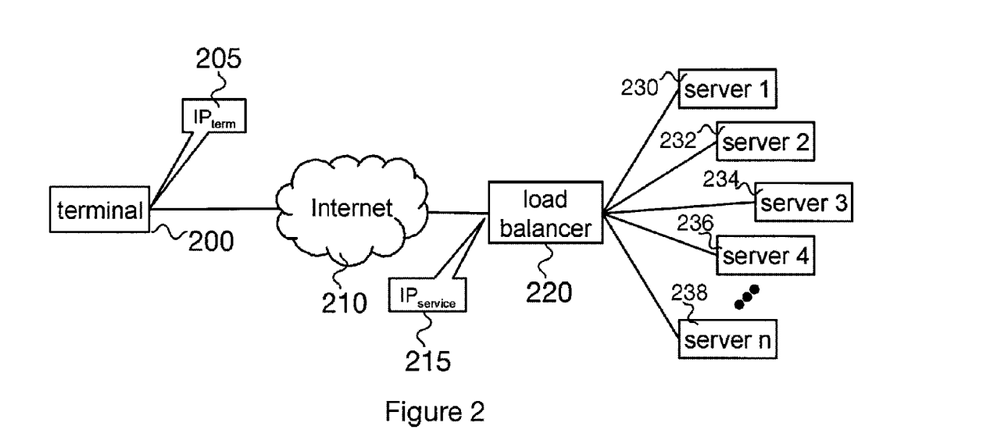
FIG. 2 shows a block diagram of an internet scenario with an embodiment of a load balancer.

FIG. 2 shows a block diagram of an internet scenario with an embodiment of a load balancer 220, which may comprise one or both of the above described apparatuses 100, 150. FIG. 2 shows a terminal 200 using an IP service over interface 205, e. g, with a source IP address $IP_{term}$, to communicate through the internet 210 with one of a plurality of servers 230, 232, 234, 236, 238, which may all provide the same service. A load balancer 220 uses one or more IP interfaces 215, possibly using one IP address $IP_{service}$, or several addresses, to communicate with the terminal 200 via the internet 210 and distribute the IP services among the plurality of servers 230-238.

For instance, if a HTTP request arrives from the terminal 200, i. e. if a new TCP connection is set up, the load balancer 220 may assign it to one of the servers 230-238, e.g. server 230. In the following, all packets belonging to this TCP connection can be sent to this server 230. One possibility is that the load balancer 220 uses the source IP address and source port number of the incoming packets, as well as possibly other header fields and information on the available servers 230-238, as input for a selection algorithm as load balancing criterion, e. g. a hash function, to select the server 230 to handle this request. Such a simple policy may work, because for a given destination IP address and port number the combination of source IP address and source port number is unique for a given TCP connection during lifetime of this connection. In case of Multipath TCP connections, such a policy alone may not be sufficient.

Figure 3:
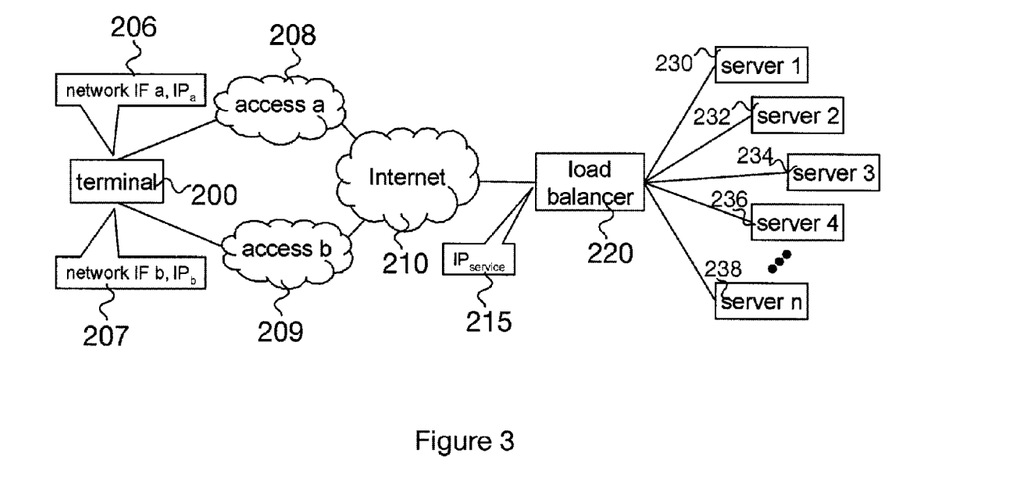
FIG. 3 shows another block diagram of an internet scenario with an embodiment of a load balancer.

FIG. 3 shows another block diagram of an internet scenario with an embodiment of a load balancer 220. The scenario depicted in FIG. 3 shows similar components as have been explained above with respect to FIG. 2, the same reference signs denote the same or similar components. Additionally, FIG. 3 shows that the terminal 200 comprises two network interfaces 206 and 207, e.g. for establishing a first subflow from address $IP_a$ through an access "a" network 208 and for establishing an additional subflow from address $IP_b$ through an access "b" network 209. In the scenario depicted in FIG. 3 both access networks 208 and 209 are connected to the above described internet 210. The different access networks 208 and 209 and the according interfaces 206 and 207 may correspond, for instance, to a wired interface as e.g. an Ethernet interface and a wireless interface, as e.g. a WLAN (as abbreviation for Wireless Local area Network) or one of the wireless interface standardized by 3GPP (as abbreviation for the $3^{rd}$ Generation Partnership Project) or 3GPP2. In embodiments, one use case for Multipath TCP is that a terminal 200 makes use of the capacity of several different access links 208, 209 by using them in parallel as shown in FIG. 3. As the terminal's network interfaces 206, 207 usually have different IP addresses, the different subflows forming, for example, a Multipath TCP session will have different source IP addresses. A load balancer 220 that is unaware of this cannot ensure by the mechanism described above that all connections forming a Multipath TCP session will be forwarded to the same server 230. Even though Multipath TCP can detect this problem, and may fall back to a backwards compatible TCP communication, there would be no added value of Multipath TCP in that case. Embodiments may provide a mechanism that overcomes this problem. Embodiments may exploit some elements of the Multipath TCP protocol to ensure proper forwarding of all packets of all subflows of a particular Multipath TCP session to the same server.

Embodiments may not be limited to TCP and MPTCP, but may generally address problems that arise if load balancers shall be used in combination with a transport protocol that uses multiple coupled connections. For example, another protocol that can use coupled connections or data packet associations in a similar way is the Stream Control Transmission Protocol (SCTP for abbreviation) and extensions for concurrent multipath transfer. In the following, some further background information on load balancing is provided and embodiments are explained for TCP and Multipath TCP, but the described principles are also valid for embodiments using other protocols that may use coupled or associated connections. In the following, the terms "coupled connection", "associated data packets" and "subflow" are used synonymously.

In the scenario depicted in FIG. 3 an unmodified load balancer 220 would not distinguish between single and coupled connections/subflows. The setup of coupled connections would not happen deterministically, given that an unaware load balancer 220 may assign the coupled connections, originating possibly from different IP addresses to different servers 230-238. According to the Multipath TCP specification, both connection endpoints will check by comparison of tokens whether a coupled connection is indeed established to the same peer. If a load balancer 220 dispatches a coupled connection to another server 230-238, this test will fail, and the coupled connection will not be set up. As a result, multipath transport may not be enabled. Multipath TCP in this case may fall back to the standard TCP transfer; i. e. communication is still possible, but less efficient. In summary, Multipath TCP on a path with one or more load balancer(s) 220 may only have an added value if load balancers 220 comprise an embodiment supporting one of the mechanisms described herein.

With an unmodified load balancer 220, there may also be small security risks, given that connections to different end systems could erroneously be coupled if they accidentally use the same tokens. Therefore, embodiments may provide an apparatus 150 or may also include a uniqueness check for tokens. Embodiments may, for example, take advantage of IETF's Multipath TCP protocol design and its characteristics. For example, the underlying mechanism of exchanging tokens in order to couple connections may be utilized in embodiments, which could also utilize other protocols, as e.g. application layer protocols, etc.

Embodiments may be comprised in a load balancer and may enhance the operation in order to handle coupled connections. Such an embodiment of a load balancer may use functions to determine and store the protocol information exchanged during the setup of coupled connections, and it may use this information in order to dispatch the coupled connections of a session to the same server, as it was already described with the help of FIG. 1a. In some embodiments, the load balancer may read and process the tokens, i.e. the information on the data packet association that are exchanged during a connection setup phase and during a subsequent data packet exchange. Embodiments may enable interaction with the transport protocol using coupled connections.

In the following, the principle of setting up coupled connections is briefly explained as background information for understanding embodiments. The mechanism presented for the following embodiment is the one currently defined for Multipath TCP. A coupled connection being part of a session can be identified by the combination of source IP address, source port number, destination IP address, and destination port number. In order to identify and link the coupled connections, and for security reasons, at least one additional identifier (usually called token) may be used in embodiments, which may uniquely identify the session a coupled connection belongs to. Instead of using one token per session, it is also possible to use two (or more) tokens that are locally unique at the endpoints. Details of a potential method to identify coupled connections can be found for instance in the protocol specification of Multipath TCP, cf. A. Ford, C. Raicui, M. Handley, "TCP Extensions for Multipath Operation with Multiple Addresses", IETF Internet Draft, work in progress, October 2010, draft-ietf-mptcp-multiaddressed-02, or in an alternative protocol design, cf. M. Scharf, "Multi-Connection TCP (MCTCP) Transport", IETF Internet Draft, work in progress, July 2010, draft-scharf-mptcp-mctcp-01, which shall be incorporated herein. In the following, details of multipath protocols are only described as far as they are needed to understand embodiments.

Figure 4:
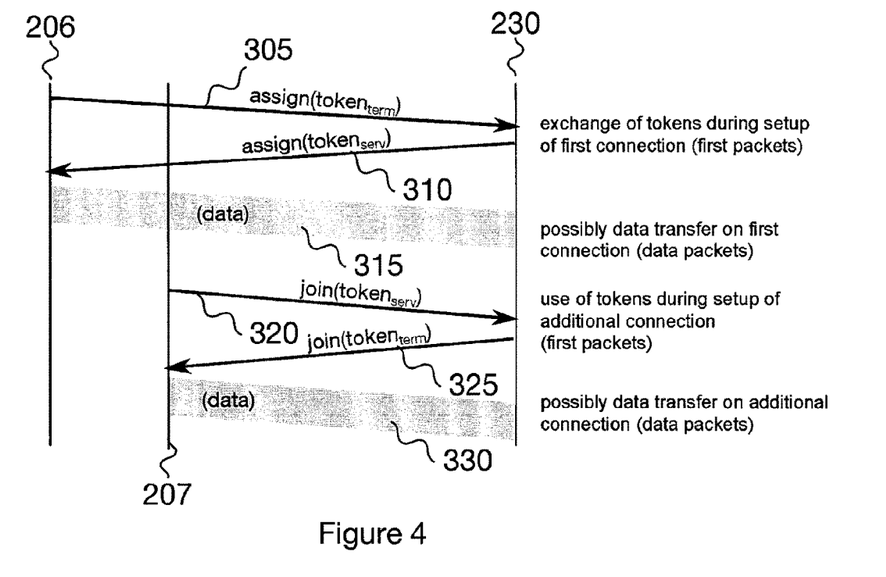
FIG. 4 shows a message sequence chart of a MPTCP set up as used by an embodiment.

FIG. 4 shows a message sequence chart of an MPTCP set up as can be used by an embodiment. FIG. 4 shows in a simplified form the setup of coupled connections forming a session. During setup of the first connection, the two endpoints exchange tokens that will be used to identify the coupled connection at the respective endpoints ('assign' messages). On the terminal side FIG. 4 shows the two interfaces 206 and 207 from which, messages indicated by arrows in FIG. 4 are transmitted to the server 230, also having an according interface, e g., with address $IP_{service}$. First, two assigning messages 305 and 310 are exchanged between the network interface 206 and the server 230. The message 305 may include a token from the terminal 200, corresponding to the above mentioned present data packet, and the message 310 may include a token from the server 230, corresponding to the above mentioned response data packet. These tokens are exchanged during the setup of a first connection (first packets). Subsequently, possibly a data transfer 315 may be carried out on the first connection. During this data transfer, further control information may be exchanged, too. As further indicated in FIG. 4 an additional subflow may be set up using the messages 320 and 325 from the interface 207 to the server 230. Again a token from interface 207 may be transferred to the server 230 in a join-message 320, and a token from the server 230 may be transferred in the corresponding response join-message 325. Subsequently, possibly a data transfer 330 may be carried out between the second interface 207 and the server 230, being part of the session.

The two tokens may be locally unique on the host that generates the token. If one of the endpoints wants to add an additional connection to an existing session, it may signal this with a 'join' message 320, 325 during setup of the additional connection. The enclosed information allows the other endpoint to integrate the new coupled connection into an existing session.

Note that the message names ('assign', 'join') are just placeholders for the two different protocol functions that are used in multipath protocols. Furthermore, the 'join' messages 320, 325 may not necessarily transport the token values in plain text. Instead, any well-defined function could be used to calculate an identifier out of the tokens and possibly also other information the endpoints have access to, and the 'join' messages 320, 325 could include such an identifier. The only constraint may be that both endpoints can uniquely determine the session that a coupled connection belongs to.

Figure 5:
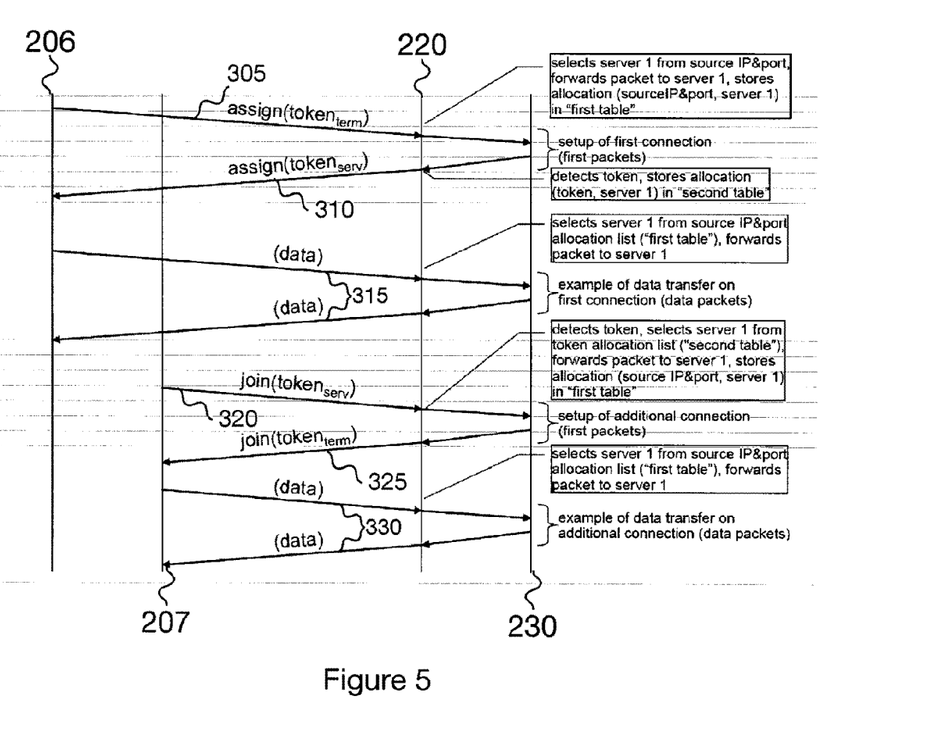
FIG. 5 shows another message sequence chart of a MPTCP set up as used by an embodiment.

FIG. 5 shows another message sequence chart of an MPTCP set up as used by an embodiment 220 implemented in a load balancer. FIG. 5 shows similar messages as were explained by FIG. 4 however, the load balancer 220 is located between the terminal 200 with its two interfaces 206 and 207 and the server 230 in the transmission path. In the embodiment depicted in FIG. 5, an embodiment of the apparatus 100 is assumed to be comprised in the load balancer 220. The apparatus 100 is adapted for forwarding a present data packet, i.e. the assign message 305, from a present source network entity 206 to a present destination network entity 230, the present destination network entity 230 being selected from a plurality of destination network entities 230-238, cf. FIG. 3. As can be seen from FIG. 5 the message 305 is received by the load balancer 220, i.e. the apparatus 100 comprises means 110 adapted for receiving the present data packet. Furthermore, the apparatus 100 comprises means 120 adapted for selecting the present destination network entity 230 based on a load balancing criterion and means 130 adapted for forwarding the present data packet 305 to the present destination network entity 230. For example, the load balancer may select server 1 (corresponding to server 230) by a policy considering the source IP and TCP port, forwards the packet to server 1, and stores the allocation of the connection to the selected server in a "first table". A table entry may comprise the source IP address and source port, the selected server, and potentially also further information, e.g. the destination IP address and the destination port. In return the server 230 provides the assign message 310, also referred to as response data packet 310. Thus, the apparatus 100 comprises means 140 adapted for receiving a response data packet 310 from the present network destination entity 230, the response data packet 310 comprising information on a data packet association, the data packet association being an association between a plurality of different data packets belonging to a data session between a data source 200 and a data destination 230. The means 120 adapted for selecting is further adapted for storing the information on the association. In other words, the load balancer 220 may detect the token and store the allocation of the token to the server in a "second table". A table entry may comprise the token and the acting server (server 1) and potentially also further information describing the multipath session.

In embodiments, the load balancer 220 may therefore handle coupled connections. Embodiments may utilize different steps that a load balancer may execute for coupled connections. Such an enhanced load balancer 220 may determine and store the token information exchanged during connection setup and use this information in order to dispatch the coupled connections of a session to the same server 230. If coupled connections are used to access services hosted on a server farm 230-238, the communication between terminal 200 and server 230 may pass a load balancer 220 acting as a 'layer 4' gateway. This case was already explained using FIG. 3.

Embodiments may provide a load balancer 220 acting as a transparent 'layer 4' gateway having one (or several) publicly visible IP address(es) and forwarding packets to the severs 230-238 by another forwarding mechanism, such as rewriting of addresses. From the perspective of clients or terminals 200, all coupled connections may terminate at the load balancer 220. A load balancer 220 may perform functions that are similar like the ones required in a host supporting coupled connections.

Subsequently, possibly a data transfer 315 may be carried out on the first connection. According to the above description and FIG. 5, when a new connection is set up from the terminal 200 side, the load balancer 220 may first check whether the packet is a setup packet for a protocol using coupled connections (such as Multipath TCP) and then it may execute the following steps in that case. In some embodiments the load balancer 220 may check if the connections setup packet 305, i.e. the present data packet or a TCP SYN, contains a 'join' message 320. If no 'join' message 320 is found, the load balancer 220 may apply a server selection mechanism, e. g. a hash on the source IP address and source port number or some other load balancing criterion, to select a server 230. Then, the combination of source IP/source port of the packet and server 230, as well as possibly other information, may be added to a "first lookup table" and the packet can be forwarded to the selected server 230. The "first lookup table" may map a flow to a server 230 and it may also be utilized for single connections. In the following the terms "first lookup table" and "first table" will be used synonymously, the same applies to the terms "second lookup table" and "second table".

In case of a first connection of a session, the server 230, i.e. the present destination network entity, may respond to a connection setup packet 305 (TCP SYN), i.e. the present data packet, with an acknowledgement packet (TCP SYN/ACK) 310, i.e. the response data packet, containing an 'assign' message with the token, i.e. the information on a data packet association, e.g. chosen from the server 230 for the new coupled connection. If an 'assign' message 310 is detected, the load balancer 220 may determine the originating server 230 and store the combination of token and server 230 in a "second lookup table". Then the processing of the packet continues and it is forwarded to the Internet. In other words, the means 120 adapted for selecting can be further adapted for storing information on the present destination network entity together with the information on the data packet association.

In embodiments the means 110 adapted for receiving can be further adapted for receiving an associated data packet 320 from a different source network entity 207, the associated data packet 320 being received after the response data packet 310, the associated data packet 320 belonging to the data session and comprising information on the data packet association (token). The means 120 adapted for selecting can be further adapted for selecting the present destination network entity 230 based on the information on the data packet association, and the means 130 adapted for forwarding may be further adapted for forwarding the associated data packet 320 to the present destination network entity 230. In other words, if a 'join' message 320 is found in a connection setup packet (i. e., TCP SYN) originating from the Internet 210, an additional connection as part of an already existing coupled connection may be requested. In this case, the load balancer 220 may take the information (token) from the 'join' message 320 and may use it as an input in the "second lookup table" to find and select the same server 230 as for the first connection. The load balancer 220 may detect the token, select server 1 from a token allocation list ("second table"), forward the packet to server 1 and store the mapping of the connection to the selected server in a "first table", e. g., by storing the allocation (source IP and port, server 1). Furthermore, information about the coupled connection, such as the source IP/source port of the first packet and server 230 may be added to the "first lookup table" and the packet 320 is forwarded to the server. In embodiments, for all other incoming data packets of this session, the load balancer 220 may select the server 230 from the "first lookup table" using for instance the source IP/source port of the packet as input and forward the packet to the assigned server 230. Moreover, data packets, i.e. all packets not being the first packet of a connection sent by any server 230-238 are forwarded to the Internet 210 without further processing. The load balancer 220 may select server 1 from the IP address and port allocation list ("first table") and forward the packet to server 1.

In embodiments the information on the data packet association, i.e. a session and/or a subflow, comprised in the response data packet 310 can be identical to the information on the data packet association comprised in the associated data packet 320, i.e. in some embodiments the token used for the first subflow may be identical to the token used for an additional subflow. The information on the data packet association may correspond to a token of Multipath TCP or to a set of different tokens of Multipath TCP. In other embodiments, the information on the data packet association comprised in the response data packet 310 can be different from the information comprised in the associated data packet 320. The information on the data packet association comprised in the response data packet 310 may correspond to a set of different tokens of Multipath TCP and the information on the data packet association comprised in the associated data packet 320 may correspond to one particular token of Multipath TCP comprised in the set of different tokens of Multipath TCP. The means 120 adapted for selecting can be further adapted for storing information on the present destination network entity 230 together with the information on the data packet association (token).

Figure 6A:
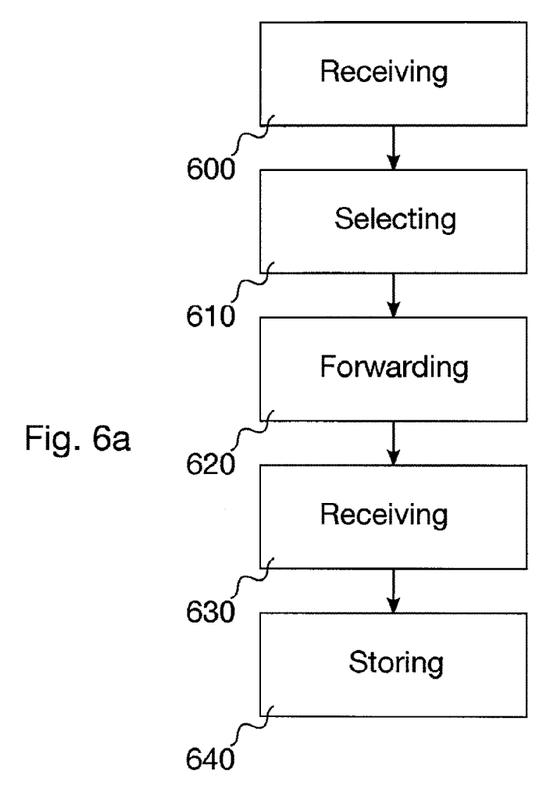
FIG. 6a shows a flow chart illustrating an embodiment of a method for forwarding.

FIG. 6a shows a flow chart illustrating an embodiment of a method for forwarding. According to the above, the method is for forwarding a present data packet 305 from a present source network entity 206 to a present destination network entity 230 and the present destination network entity 230 being selected from a plurality of destination network entities 230-238. The method comprises a step 600 of receiving the present data packet and a step 610 of selecting the present destination network entity based on a load balancing criterion. Moreover, the method comprises a step 620 of forwarding the present data packet to the present destination network entity 230. The method further comprises a step 630 of receiving a response data packet from the present network destination entity, the response data packet comprising information on a data packet association, the data packet association being an association between a plurality of different data packets belonging to a data session between a data source and a data destination. The method further comprises a step 640 of storing the information on the association.

Figure 6B:
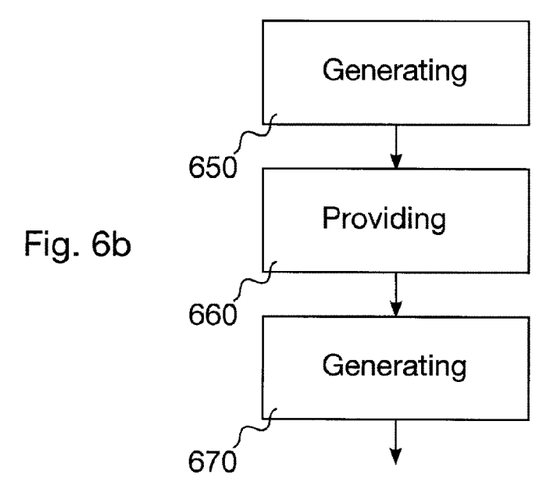
FIG. 6b shows another flow chart illustrating an embodiment of a method for providing.

FIG. 6b shows another flow chart illustrating an embodiment of a method for providing. As will be further detailed subsequently, the method is for providing information on a data packet association to a network entity 200,220, 230-238. The method comprises a step 650 of generating identification for a data packet association, the identification for the data packet association being valid for a time period. The method may comprise a step 660 of providing the information on the data packet association comprising information on the identification of the data packet association to different network entities. The method comprises a further step 670 of generating a plurality of identifications for data packet associations is such that each of the plurality of identifications is different from the identification for the data packet association when generated during the time period.

Figure 7A:
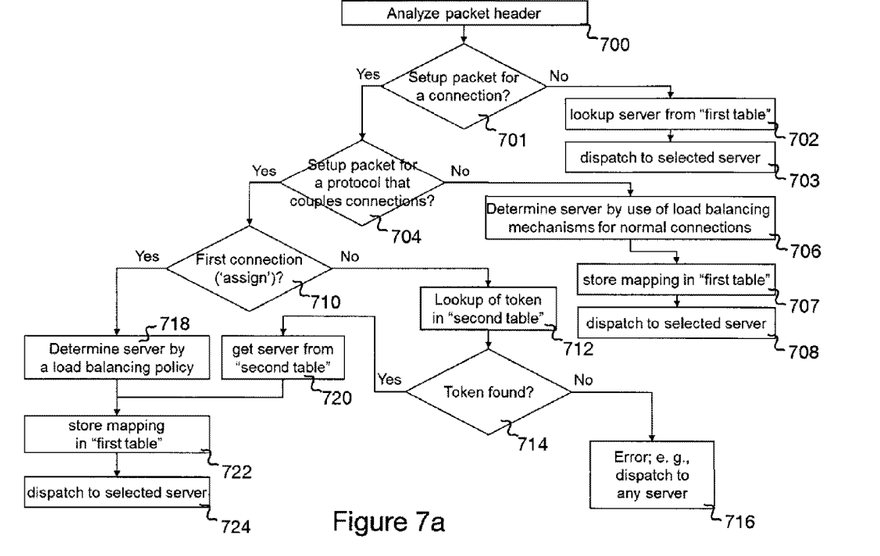
FIG. 7a shows a flow chart illustrating an embodiment of a method.

FIG. 7a shows a flow chart illustrating an embodiment of a method for forwarding a present data packet from a present source network entity to a present destination network entity, the present destination network entity being selected from a plurality of destination network entities. The flow chart illustrates the method when a data packet is received from the internet, in line with the scenario depicted in FIG. 3. After receiving the present data packet, in a first step 700 the packet header is analyzed, for example, an IP or a TCP packet header. In a step 701, the method may determine that said packet is a setup packet for a connection. If the packet does not correspond to a setup packet, the method may, in a subsequent step 702, look up a corresponding server address from storage, e.g. from a first lookup table. After having looked up the server address the packet can then be dispatched in step 703 to the server. If, in step 701, it is determined that the packet corresponds to a setup packet for a connection, subsequently, in step 704 it can be further determined whether the packet corresponds to a setup packet for a protocol that couples connections. If such a packet is not determined, load balancing mechanisms for server determination may be used in step 706 as for normal TCP connections. In other words, the present destination network entity is selected for packets similar to the present data packet based on a load balancing criterion, when the received data packet is not an associated packet or a set up message. In step 707 the mapping of the data packet and the server can be stored, e.g. in the first lookup table.

Subsequently, in step 708 the data packet can be dispatched to the selected server. If in step 704 a setup packet for a protocol that couples connections is detected, subsequently in a step 710 it can be determined whether the packet refers to a first connection assignment. In other words, it can be determined that the packet is meant to set up a first connection of a session, i.e. the packet corresponds to the above present data packet. If no such packet is determined in a step 712 it can be checked, whether the token comprised in the packet is already stored, in an embodiment a lookup table, namely the second lookup table for tokens, may be used. In other words, it is checked whether the packet corresponds to an associated data packet. If in step 714 the token is not found, an error can be detected in step 716, for example the packet can then be dispatched to any server or an error message can be sent. If an according token is found in step 714 in a subsequent step 720, the lookup table, i.e. the second lookup table, can be checked and a server address can be determined from the second lookup table, i.e. for an associated data packet the present destination network entity can be determined from storage. If in step 710 a setup packet for a first connection is determined, subsequently, in step 718, an according server can be determined according to a load balancing policy. Following step 718 and also following step 720 the mapping can be stored in a first lookup table in step 722. In addition, an embodiment may also store information in the second lookup table, e. g., to prepare the addition of an entry in a later step. Subsequently, in a step 724, the packet can be dispatched to the selected server.

Figure 7B:
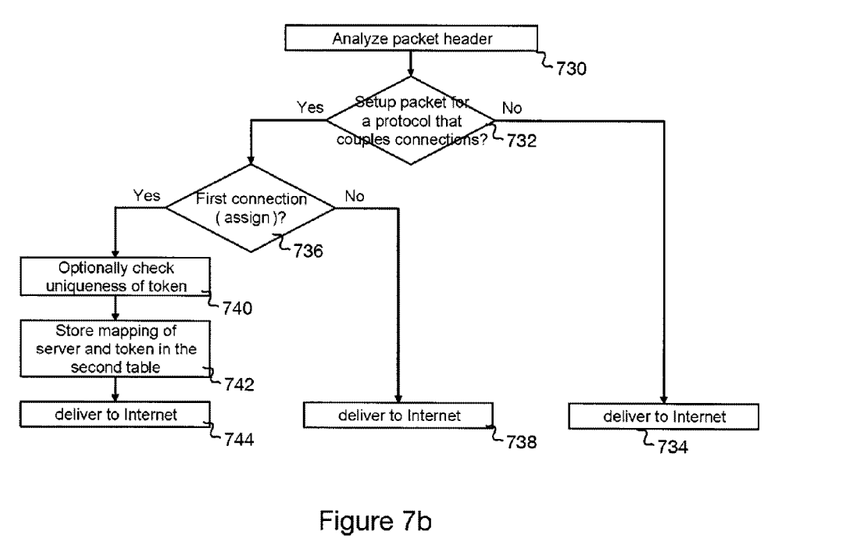
FIG. 7b shows another flow chart illustrating an embodiment of a method.

FIG. 7b shows another flow chart illustrating an embodiment of a method, where in FIG. 7b the steps of the method are illustrated when a data packet is received from the server. In a first step 730 the packet header of the received data packet is analysed. In a subsequent step 732 the method determines, whether the packet corresponds to a setup packet for a protocol that couples connections. In other words, in step 732 it is checked whether the packet could correspond to a response data packet. If it is determined that the data packet does not correspond to a response data packet it is subsequently delivered to the Internet in step 734 in a regular manner. If, however, it is determined that the received data packet corresponds to a setup packet for a protocol that couples connections in step 732, subsequently in step 736 it is further checked, whether the packet corresponds to a first connection assignment, i.e. to a response data packet as described above. If this is not the case in step 738 the packet is delivered to the Internet in a regular manner. If in step 736 it is determined that the packet corresponds to a first connection assignment, i.e. to a response data packet, in step 740 an optional check for uniqueness of the token may be carried out. In step 742, the mapping of the server and the token can be stored in the second lookup table before in step 744 the packet is delivered to the Internet. More details on step 740, i.e. the uniqueness check of the token or the information on the data packet association will be detailed subsequently.

Figure 8:
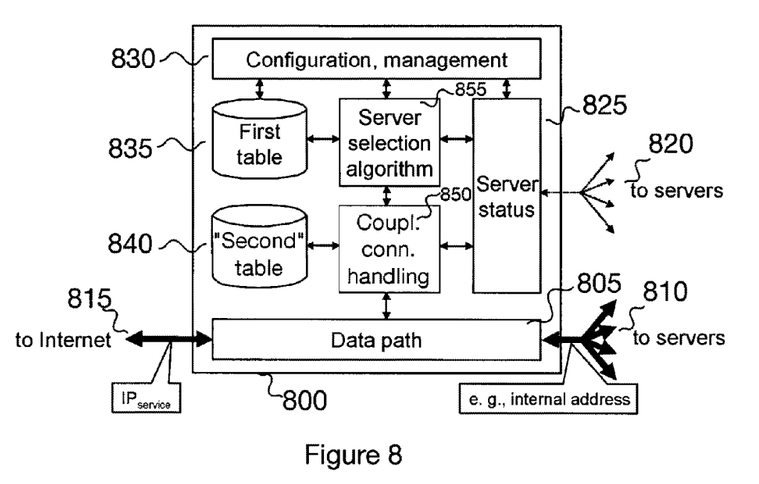
FIG. 8 shows another block diagram of an embodiment in a load balancer.

FIG. 8 shows another block diagram of an embodiment in a load balancer 800. FIG. 8 shows an embodiment of a load balancer 800, comprising the above described apparatus 100. FIG. 8 shows a data path 805, which transfers the data packets between the servers 810 and the Internet 815. Towards the Internet 815 an IP service may be provided, towards the servers 810, for example, server address mapping may be used. Moreover, the load balancer 800 may have control connections 820 for the servers and monitor the server status shown in block 825. According to the above description the load balancer 800 may utilize a server selection algorithm 855 together with a first lookup table 835 for storing from which source data packets have been forwarded to which server. A configuration and management entity 830 may control these components. Moreover, the load balancer 800 may comprise a coupled connection handling entity 850, in which the apparatus 100 may be implemented. For storage purposes the coupled connection handling entity 850 can be connected to a second lookup table 840, in order to store the information on a data packet association, the tokens, and the server addresses, respectively. In FIG. 8, the main components of a load balancer 800 are depicted. The functions for handling coupled connections are represented by the coupled connection handling box 850 and the optional second lookup table 840. The two tables, "first table" 835 and "second table" 840, may conceptually store different information. Another embodiment may integrate the information in one table.

According to the above described embodiment, the apparatus 100 may enable handling of coupled connections or data packet associations in a load balancer 800. In further embodiments, the means 120 adapted for selecting can be further adapted for removing the information on the data packet association from storage after a predefined time has elapsed without receiving a data packet comprising the information on the data packet association, or after reception of signalling information closing a connection and/or session. Embodiments may, in order to avoid excessive growing of the size of the lookup tables, detect the end of a session and remove the associated entries in the tables. In other words, the means 140 and/or the means 120 may be adapted for receiving an end of session packet and may, upon reception of such a packet remove the information on the respective data packet association from storage. Alternatively, well-known mechanisms of aging-out of old and no longer used table entries can be applied in embodiments. Moreover, in embodiments the apparatus 100 may comprise means adapted for informing the different network destination entity on the removal or change of the information on the data association.

Embodiments may further comprise a mechanism for handling the uniqueness of a token or the information on the data packet association. In order to avoid errors, two servers behind a load balancer may not use the same token, i. e., a token should be unique for the load balancer or at least unique per public IP address. In an embodiment the usage of tokens by the servers may be coordinated by the above described apparatus 150 such that token uniqueness among all servers behind a load balancer is ensured. Accordingly, in an embodiment, a server may be adapted for receiving the information on a data packet association or a token from another entity, e.g. an embodiment of the apparatus 150. In other embodiment of the apparatus 100, the means 140 adapted for receiving can be further adapted for receiving a further response data packet from a different network destination entity, the further response data packet comprising information on the data packet association, wherein the apparatus comprises means adapted for removing the information on the data association from the further response data packet or for changing the information on the data association to different information on the data association in the further response data packet. In other words, if two response data packets are received comprising the same information on the same data packet association, i.e. using the same token, the embodiment may either remove or change the second information on the data packet association. In a scenario where the tokens are selected by the servers without coordination or interaction with the load balancer such embodiments may prevent collisions.

The embodiment of a load balancer may verify for each token that it is not already in use. In case of an overlap or collision, the load balancer may prevent the use of multipath transport, e. g., by removing the corresponding TCP option from the SYN/ACK packet for Multipath TCP. In other embodiments the load balancer may transparently replace the token by another value, for all coupled connections of a session. In further embodiments several load balancers in front of a server farm may be used. Then, the load balancers could coordinate, e. g. by a signaling method, in order to execute the above described method. In other words, in such embodiments, an apparatus 100 may comprise further means adapted for receiving a data association packet from a network entity, the data association packet comprising the information on the different data packet associations. I.e. in such embodiments multiple apparatuses may be realized, which coordinate the information on the data packet association among each other, e. g., using data association packets.

Figure 9:
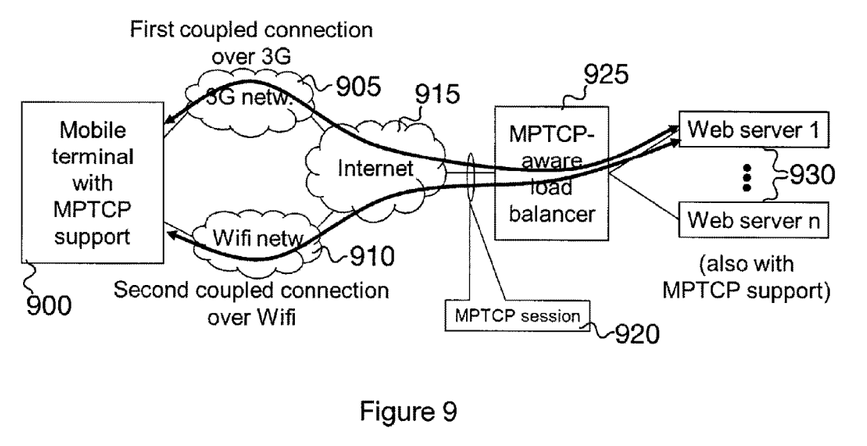
FIG. 9 illustrates an embodiment with MPTCP.

FIG. 9 illustrates an embodiment with MPTCP. FIG. 9 shows an embodiment in a scenario, wherein a mobile terminal with MPTCP support 900 uses a coupled connection over a 3G (for abbreviation of $3^{rd}$ generation cellular network) 905 wireless interface and a second coupled connection over Wi-Fi 910 to connect to the Internet 915. Both connections together form an MPTCP session 920. The mobile terminal 900 requests data from a web server, where in the scenario depicted in FIG. 9 there is a web server farm 930 behind an MPTCP aware load balancer 925 comprising an embodiment of the above described apparatus 100. Multipath TCP (MPTCP) is a TCP extension that is currently standardized by the IETF. The current protocol design is described in an IETF draft, cf. A. Ford, C. Raicui, M. Handley, "TCP Extensions for Multipath Operation with Multiple Addresses", IETF Internet Draft, work in progress, July 2010, draft-ietf-mptcp-multiaddressed-01; According to the current protocol specification, MPTCP implements the 'assign' and the 'join' messages by TCP options in the TCP header. Both messages will appear only in packets with a SYN flag, which makes it easy for the load balancer 925 to detect and analyse the messages. In both cases, the token information is encoded inside the TCP option. In the embodiment depicted in FIG. 9 the mobile terminal 900 is assumed to be a multi-homed terminal, i. e. a terminal with more than one active network interface. In this case, MPTCP permits parallel usage of both interfaces for TCP connection. In the embodiment of FIG. 9 the mobile terminal 900 accesses a Web site over a 3G 905 (as abbreviation for $3^{rd}$ Generation) and a Wifi 910 interface (as abbreviation for the WiFi-Alliance). The Web site is hosted in a Web server farm 930 and the load balancer 925 distributes the traffic to n Web servers 930. The terminal 900 is assumed to communicate with the first web server shown at the top. The load balancer 925 in front of the server farm 930 uses the embodiment in order to ensure that the two coupled connections forming the MPTCP session are indeed assigned to the same Web server.

Moreover, embodiments may provide a computer program having a program code for performing one of the above described methods when the computer program is executed on a computer or processor. A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labelled as "means", "means adapted for receiving", "means adapted for selecting", "means adapted for forwarding", "means adapted for removing", "means adapted for changing", "means adapted for informing", "means adapted for generating", or "means adapted for providing" may be provided through the use of dedicated hardware, as e.g. a receiver, a selector, a forwarder, a remover, a changer, an informer, a generator, a provider, a processor, a controller, a transceiver, as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. An apparatus configured to forward a data packet from a source network entity to a destination network entity, the apparatus comprising:
   a memory having computer readable instructions stored therein; and
   a processor configured to execute the computer-readable instructions to,
   first receive the data packet;
   select the destination network entity from a plurality of destination network entities based on a load balancing criterion;
   forward the received data packet to the destination network entity;
   second receive a response data packet from the destination network entity, the response data packet including information on a data packet association, the data packet association being an association between a plurality of different data packets belonging to a data session between a data source and a data destination;
   third receive an associated data packet from a different source network entity, the associated data packet being received after the response data packet, the associated data packet belonging to the data session and including the information on the data packet association; and
   store the information on the data packet association and information associated with the destination network entity, wherein the processor is further configured to,
   select the destination network entity based on the information on the data packet association; and
   forward the associated data packet to the destination network entity; wherein
   the information on the data packet association in the response data packet is identical to the information on the data packet association in the associated data packet, and
   the information on the data packet association in the response data packet corresponds to a token of Multipath TCP.

2. The apparatus of claim 1, wherein the processor is further configured to store the information on the destination network entity and the information on the data packet association.

3. The apparatus of claim 1, wherein the processor is further configured to remove the information on the data packet association from the memory after a time period has elapsed without receiving the data packet including the information on the data packet association, or after receiving a request to tear down the data packet association.

4. The apparatus of claim 1, wherein the processor is further configured to,
   fourth receive a further response data packet from a different destination network entity, the further response data packet also including the information on the data packet association, and
   one of remove the information on the data packet association from the further response data packet, or change the information on the data packet association in the further response data packet.

5. The apparatus of claim 4, wherein the processor is further configured to inform the different destination network entity about the removal of the information on the data packet association from the further response data packet or the change of the information on the data packet association.

6. The apparatus of claim 3, wherein the processor is further configured to receive a data association packet, different from the associated data packet, from a network entity, the data association packet including the information on one or more data packet associations.

7. A method for forwarding a data packet from a source network entity to a destination network entity, the method comprising:
   first receiving the data packet;
   selecting the destination network entity from a plurality of destination network entities based on a load balancing criterion;
   forwarding the received data packet to the destination network entity;
   second receiving a response data packet from the destination network entity, the response data packet including information on a data packet association, the data packet association being an association between a plurality of different data packets belonging to a data session between a data source and a data destination;

third receiving an associated data packet from a different source network entity, the associated data packet being received after the response data packet, the associated data packet belonging to the data session and including the information on the data packet association;

storing the information on the data packet association and information associated with the destination network entity, wherein the selecting selects the destination network entity based on the information on the data packet association; and the forwarding forwards the associated data packet to the destination network entity; wherein the information on the data packet association in the response data packet is identical to the information on the data packet association in the associated data packet, and the information on the data packet association in the response data packet corresponds to a token of Multi-path TCP.

8. A non-transitory computer readable medium comprising computer readable instruction which when executed by a processor, causes the processor to, first receive the data packet;

select the destination network entity from a plurality of destination network entities based on a load balancing criterion;

forward the received data packet to the destination network entity;

second receive a response data packet from the destination network entity, the response data packet including information on a data packet association, the data packet association being an association between a plurality of different data packets belonging to a data session between a data source and a data destination;

third receive an associated data packet from a different source network entity, the associated data packet being received after the response data packet, the associated data packet belonging to the data session and including the information on the data packet association; and store the information on the data packet association and information associated with the destination network entity, wherein the execution of the computer readable instruction by the processor further cause the processor to, select the destination network entity based on the information on the data packet association; and forward the associated data packet to the destination network entity; wherein the information on the data packet association in the response data packet is identical to the information on the data packet association in the associated data packet, and the information on the data packet association in the response data packet corresponds to a token of Multi-path TCP.

\* \* \* \* \*